US006628604B2

(12) United States Patent
Van Kesteren et al.

(10) Patent No.: US 6,628,604 B2
(45) Date of Patent: Sep. 30, 2003

(54) MAGNETIC HEAD HAVING A MAGNETIC COIL

(75) Inventors: Hans Willem Van Kesteren, Eindhoven (NL); Frank Cornelis Penning, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 164 days.

(21) Appl. No.: 09/837,941

(22) Filed: Apr. 19, 2001

(65) Prior Publication Data

US 2002/0012197 A1 Jan. 31, 2002

(30) Foreign Application Priority Data

Apr. 19, 2000 (EP) ............................................. 00201412

(51) Int. Cl.[7] ................................................. G11B 11/03
(52) U.S. Cl. ........................ 369/300; 360/126; 360/123
(58) Field of Search ................................. 360/126, 123; 369/300, 13.23

(56) References Cited

U.S. PATENT DOCUMENTS

| 5,014,254 A | * | 5/1991 | Van Rosmalen et al. | 369/13.14 |
|---|---|---|---|---|
| 5,402,293 A | * | 3/1995 | Smith | 369/13.1 |
| 5,831,797 A | * | 11/1998 | Schaenzer et al. | 369/13.12 |
| 5,886,959 A | * | 3/1999 | Bischoff et al. | 369/13.23 |
| 5,903,525 A | * | 5/1999 | McDaniel et al. | 369/13.23 |
| 5,936,814 A | | 8/1999 | Slade et al. | 360/126 |
| 5,978,319 A | * | 11/1999 | Wang et al. | 369/13.23 |
| 6,130,863 A | * | 10/2000 | Wang et al. | 369/13.23 |
| 6,407,884 B1 | * | 6/2002 | Osborne et al. | 360/114.01 |

FOREIGN PATENT DOCUMENTS

| WO | WO9848418 | 4/1998 |
|---|---|---|
| WO | WO9848418 | 10/1998 |
| WO | WO9956277 | 4/1999 |

* cited by examiner

Primary Examiner—Brian E. Miller
(74) Attorney, Agent, or Firm—Michael E. Belk

(57) ABSTRACT

A magnetic head suitable for use in a magneto-optical apparatus. The magnetic head has a flat electromagnetic coil (1) with a central opening (3). The coil has parallel coil layers (5a, 5b), each of the coil layers having a turn (5A, 5B) arranged around the central opening. At least one of the coil layers has turns of which the turns closer to the central opening have smaller widths (w) than the turns further away from the central opening. At least one of the coil layers has an outermost turn ($5B_o$) situated closer to the central opening than the outermost turn ($5A_o$) of one of the other coil layers. The defined coil structure has a limited capacitance while the power dissipation is also limited.

11 Claims, 5 Drawing Sheets

MAGNETIC HEAD HAVING A MAGNETIC COIL

BACKGROUND OF THE INVENTION

1. Technical Field

The invention relates to magnetic head for use in a magneto-optical device, which magnetic head includes an at least substantially flat magnetic coil having a central opening, which coil has coil layers which extend at least substantially parallel to each other, each of the coil layers having at least one electrically conductive turn which extends around the central opening.

2. Related Art

Such a magnetic head is known from WO-A 98/48418. The known magnetic head includes a flat magnetic coil having two parallel substantially equiform coil sections, each coil section comprising a plurality of turns formed by means of a thin-film technology. The magnetic coil extends in a magnetic yoke which, with the coil, defines a central passageway for an optical beam. The known magnetic head is intended for use in a magneto-optical (MO) system for the storage of data in a magneto-optical medium. During the recording or read-out of data the magnetic head is situated at a short distance from the magneto-optical medium. The magneto-optical system comprises said magnetic head, a laser source and optical elements, which include a focusing lens, enabling a laser beam to be routed to a recording layer via the central passageway. During the storage of data a laser beam is utilized for reducing the coercivity of the recording layer of the magneto-optical medium in that selected spots are heated to approximately the Curie temperature of the recording layer. Meanwhile, the magnetic coil is activated to generate a time-varying magnetic field traversing the recording layer in order to define a pattern of magnetic domains. During the read-out of stored information the MO medium is scanned with a laser beam, use being made of the magneto-optical Kerr effect, which is known per se.

During the magneto-optical storage of information the minimum width of the stored data bits is dictated by the diffraction limit, i.e. the numerical aperture (NA) of the focusing lens used and the wavelength of the laser beam. A reduction of said width is generally based on shorter-wavelength lasers and higher-NA optical focusing systems. During magneto-optical recording the minimum bit length can be reduced to below the optical diffraction limit by using Laser Pulsed Magnetic Field Modulation. In this process the bit transitions are determined by the speed of reversal of the magnetic field and the temperature gradient induced by switching of the laser source. In order to obtain small bit lengths and high data rates magnetic coils are required which meet specific requirements such as a low self-inductance, a low capacitance and a low resistance. These requirements cannot be met by means of conventionally wound coils. Therefore, use is now made of coils manufactured by means of a multi-layer technique, particularly a thin-film technique.

A magnetic coil suitable for high data rate magneto-optical recording should have a good high-frequency behavior. This means that such a coil should have a satisfactorily low self-inductance, a low capacitance and a low resistance, while the power dissipation should be of an acceptable level. Thus, it is true that an increase of the number of turns of a given coil configuration may lead to a reduction of the current required to generate a certain magnetic field, since the power dissipation is proportional to the square of the current and is only proportional to the resistance, but an increase of the number of turns also leads to an increase of the self-inductance and thereby limits the data rate.

The coil configuration used in the known magnetic head does not provide a solution to the problem outlined above.

SUMMARY OF THE INVENTION

It is an object of the invention to provide a magnetic head which is suitable for use in a magneto-optical device for information storage at a high speed, for example 100 Mbit/s, and which for this reason includes a magnetic coil which can be used at high switching frequencies and which has an acceptably low power dissipation for its envisaged use.

This object is achieved with the magnetic head according to the invention, which magnetic head includes an at least substantially flat magnetic coil having a central opening, which coil has coil layers which extend at least substantially parallel to each other, each of the coil layers having at least one electrically conductive turn which extends around the central opening, wherein at least one of the coil layers has turns, of which the turns situated nearer the central opening have smaller widths than the turns situated farther away from the central opening, at least one of the coil layers having an outermost turn situated nearer the central opening than the outermost turn of one of the other coil layers. The central opening of the magnetic coil can serve as a passage for a laser beam. The central opening, which is defined by inner turns, may actually be an opening or it may be a transparent central area formed by a material that differs from the coil material, particularly a transparent material, such as $Al_2O_3$, $SiO_2$, $Si_3N_4$. The turns may be formed from metals such as Cu, Au, Al. In the magnetic head in accordance with the invention the magnetic coil has a turns density which decreases outwardly from the central opening, which has a favorable effect on the power dissipation of the coil, while the coil layers have mutually different dimensions, which keeps the capacitance within bounds. For an adequate magneto-optical recording it is important that the magnetic coil is capable of generating a magnetic field of the order of 200 Oe (16 kA/m) in and near the central opening. Since the turns which are situated nearer the central opening are most effective in generating the magnetic field, they provide a significant contribution to the generation of the magnetic field in and in the vicinity of the central opening. As a result of a low self-inductance and a low capacitance the magnetic head in accordance with the invention exhibits a good high-frequency behavior. This is corroborated by experiments. The magnetic head is suitable for use in MO devices for information storage with a very high density, for example 100 Gbit/in$^2$. Another important effect of the measures in accordance with the invention is that a comparatively large central opening can be used. A comparatively large central opening may be desired if the magnetic head is used in a slider of a magneto-optical device, in which an optical system has been provided and in which a part of the optical system has a mechanically non-rigid connection to the slider. Furthermore, a large central opening may be desirable for the purpose of tracking, for which the position of a laser beam relative to the central opening is varied. The magnetic head in accordance with the invention can be used not only for information recording but also for information reading.

In order to limit the thickness of the magnetic coil the number of coil layers in the magnetic head will be limited to 2 or 3.

Claim 2 defines a practical embodiment of the magnetic head in accordance with the invention.

An embodiment of the magnetic head in accordance with the invention is characterized in that the decrease of the widths of the turns towards the central opening varies uniformly. In the case of a circular magnetic coil the distance between the turns of a coil layer is preferably maintained constant for technological reasons and is preferably minimized in order to guarantee a high efficiency of the coil. Here, efficiency is to be understood to mean the strength of the magnetic field generated at a given power. The width of a turn is preferably proportional to the n-th power of the distance to the central axis of the magnetic coil, which axis extends through the central opening, where $0.7 \leq n \leq 2$.

An embodiment of the magnetic head in accordance with the invention is characterized in that the one outermost turn is situated substantially nearer the central opening than the other outermost turn. The number of turns of the one coil layer can be substantially smaller than the number of turns in the other coil layer, for example half this number. It has been found that this enables significant reductions in capacitance and power dissipation to be achieved.

An embodiment of the magnetic head in accordance with the invention is characterized in that the coil layers are thin-film layers. The magnetic coil is consequently a coil manufactured by means of a thin-film technique. The applied technique may be a technique which is known per se. It has been found that the high-frequency behavior can be further improved if at least two coil layers, preferably all the coil layers, are arranged on a flat base because this yields a further reduction of the parasitic capacitance and conductance. Claim 6 defines an embodiment of the magnetic head in accordance with the invention which relates to this aspect.

The invention also relates to a method of manufacturing the magnetic head in accordance with the invention. The method in accordance with the invention is defined in claim 7. The measure defined in claim 7 means that the production process includes one or more planarizing operations. This means, for example, that after the deposition of an insulating layer a mechano-chemical polishing step is carried out. Alternatively, a spin-on-glass planarization may be used. The methods mentioned are both known per se.

The invention further relates to a slider for use in a magneto-optical device and provided with the magnetic head in accordance with the invention, notably as defined in any one of the claims 1 through 6.

The slider in conjunction with a magneto-optical medium ensures that in operation an air film is formed between the magnetic head and the medium, the magnetic head floating at a substantially constant distance from the magneto-optical medium, which can be achieved in a manner known per se.

An embodiment of the slider in accordance with the invention has a slider body with which the magnetic coil is integrated.

The invention further relates to a magneto-optical device including the magnetic head in accordance with the invention, particularly as defined in any one of the claims 1 through 6, or including the slider in accordance with the invention, particularly as defined in claim 8 or 9. The magneto-optical device in accordance with the invention is suitable for magneto-optically recording information in a magneto-optical medium in a manner known per se. The device is also suitable for reading information.

With reference to the claims, it is to be noted that various combinations of characteristic features and measures as defined in the claims are possible.

BRIEF DESCRIPTION OF THE DRAWINGS

The invention will now be described in more detail, by way of example, with reference to the drawings, in which.

DETAILED DESCRIPTION OF THE INVENTION

Figure 1:
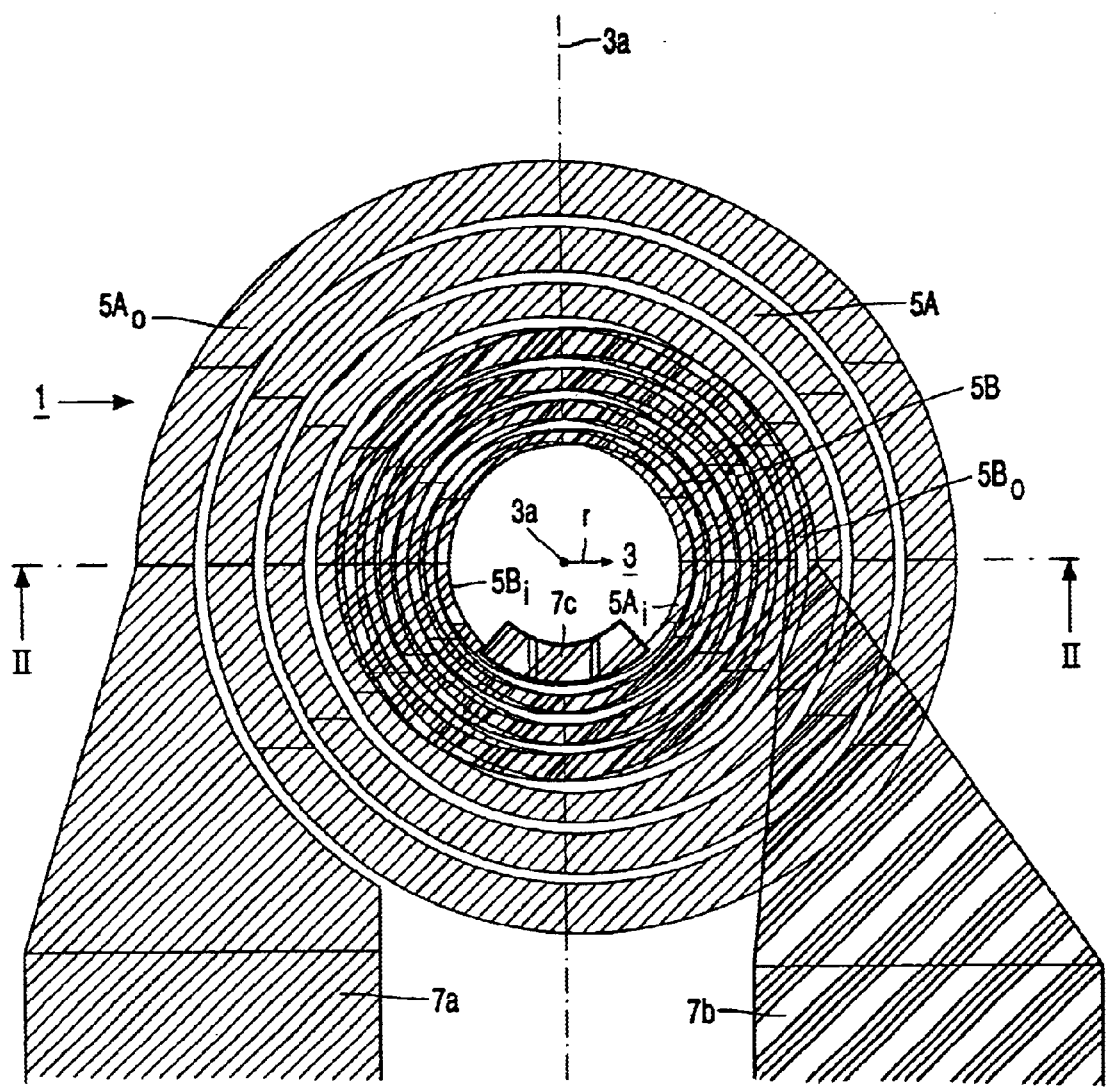
FIG. 1 is a diagrammatic plan view which shows an embodiment of the magnetic head in accordance with the invention.
Figure 2:
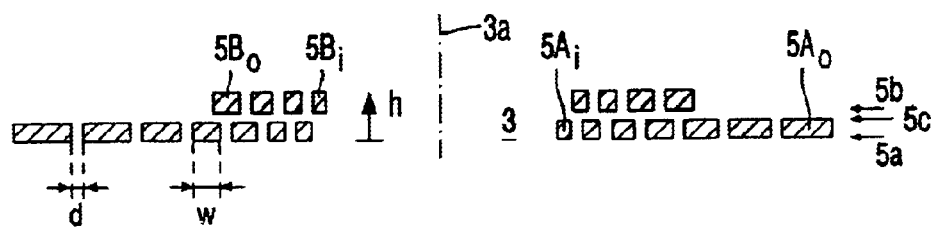
FIG. 2 shows the embodiment of the magnetic head in a sectional view taken on the line II—II in FIG. 2.

The embodiment of the magnetic head in accordance with the invention shown in FIGS. 1 and 2 is suitable for use in a magneto-optical device. The magnetic head includes a flat round electromagnetic coil 1, briefly referred to as the magnetic coil 1 and having a central opening 3 with a central coil axis 3a. The magnetic coil 1 in the present example has two coil layers 5a and 5b, which extend parallel to one another and which are separated from one another by an insulating layer 5c of, for example, $SiO_2$. The coil layer 5a in the present example has seven turns 5A made of Cu, including an outermost turn $5A_O$ and an innermost turn $5A_i$ situated near the central opening 3. The coil layer 5b in the present example has four turns 5B, also made of Cu, including an outermost turn $5B_O$ and an innermost turn $5B_i$ situated near the central opening 3. The central opening 3 is filled with a transparent material such as $SiO_2$. Each set of turns 5A and 5B has a connecting surface 7a and 7b, respectively, the two sets being electrically interconnected by an interconnection 7C.

In the present example the turns in each of the coil layers 5a and 5b have a spiral shape. Of the set of turns 5A and 5B the turns situated nearer the central opening 3 have a smaller width w than the turns situated farther away from the central opening 3. Viewed from the turns $5A_i$ and $5B_i$ the width w gradually increases towards the turns $5A_O$ and $5B_O$. In the present example the distance d between the turns in each of the coil layers 5a and 5b is constant. The outermost turn $5B_O$ has a substantially smaller diameter than the outermost turn $5A_O$. The present magnetic coil can be manufactured by means of a thin-film technique which is known per se, in which case it is preferred to carry out a planarizing operation, for example a mechano-chemical polishing operation, before a coil layer is made, in order to obtain a flat base for the relevant coil layer. The thin-film layers may be deposited on a substrate, for example formed by a slider body of a slider.

Figure 3:
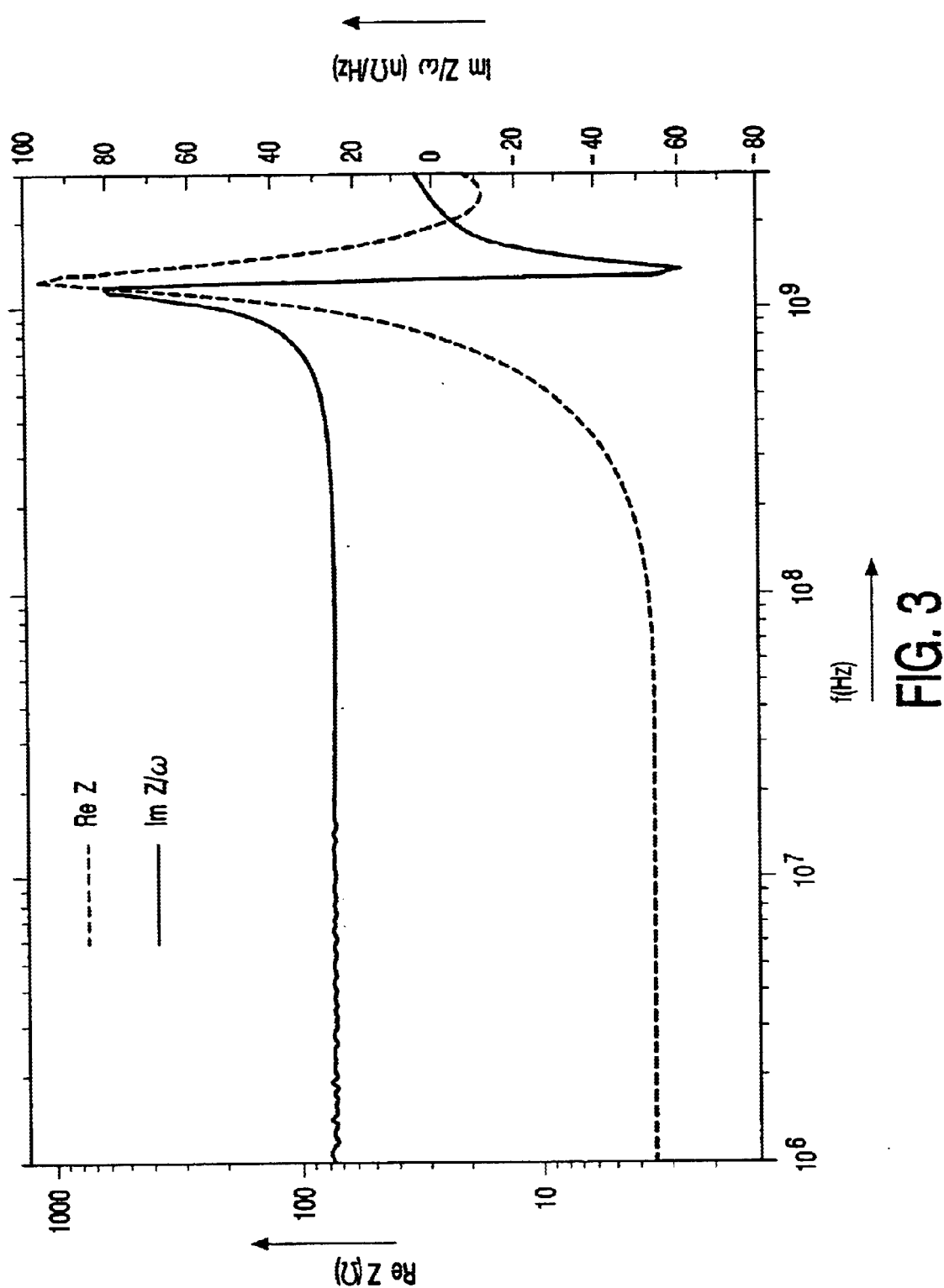
FIG. 3 is a graph which represents the impedance as a function of the frequency for the embodiment of the magnetic head.

The graphical representation in FIG. 3 shows the measured impedance Z of the embodiment shown in FIGS. 1 and 2 as a function of the frequency f. Therein, ReZ is the real impedance, ImZ is the imaginary impedance and $\omega = 2\pi f$.

Figure 4:
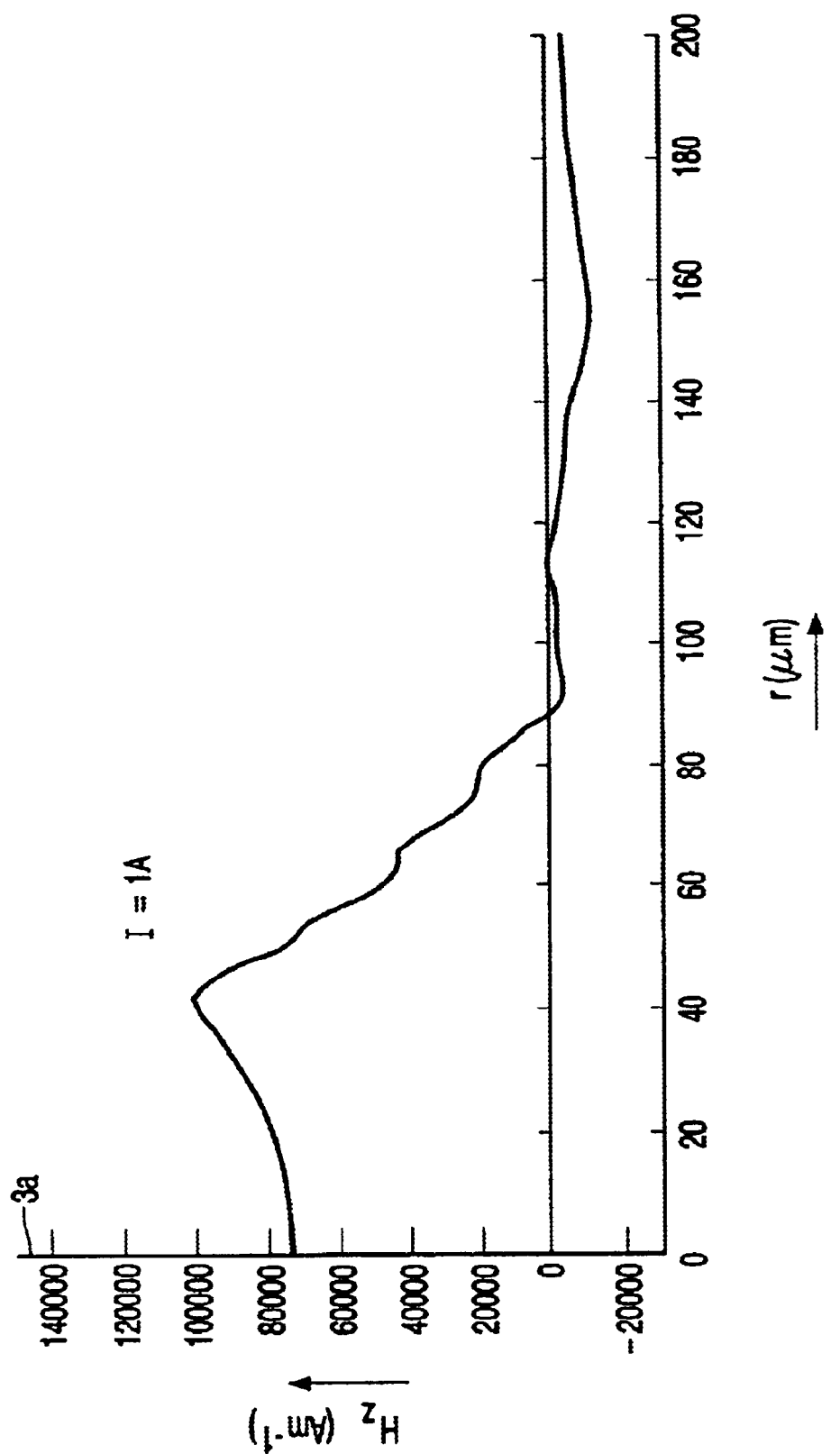
FIG. 4 is a graph which represents the field strength of the magnetic field as a function of the distance from the central axis of the embodiment of the magnetic head.

The graphical representation in FIG. 4 shows the calculated magnetic field strength $H_z$ of a model which closely resembles the embodiment shown in FIGS. 1 and 2 as a function of the radius r of the magnetic coil, determined at a height h of 13 µm, reckoned from the side of the coil layer 5a which is remote from the coil layer 5b (see also FIGS. 1 and 2). The diameter of the central opening is 90 µm, the diameter of the magnetic coil is 306 µm, and the overall height of the magnetic coil is 9 µm.

Figure 5:
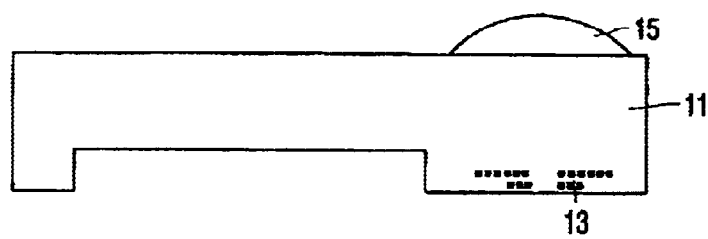
FIG. 5 is a diagrammatic side view which shows an embodiment of the slider in accordance with the invention.
Figure 6:
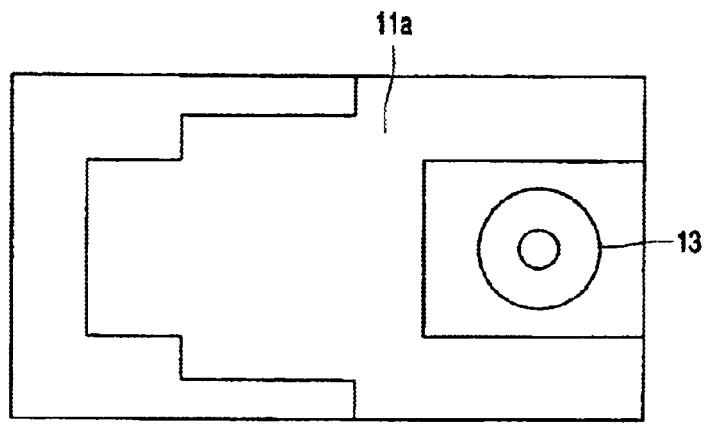
FIG. 6 is a diagrammatic underneath view which shows the embodiment of the slider in accordance with the invention, FIG. 7 diagrammatically shows a first application of the slider in accordance with the invention, FIG. 8 diagrammatically shows a second application of the slider in accordance with the invention, FIG. 9 diagrammatically shows an embodiment of the magneto-optical device in accordance with the invention.

The slider in accordance with the invention shown in FIGS. 5 and 6 is suitable for use in a magneto-optical device and has a transparent slider body 11, made of glass in the present example, in which an embodiment of the magnetic head in accordance with the invention is integrated. The magnetic coil provided therein is referenced 13. The slider has a structured surface 11a intended for cooperation with an information medium, particularly an MO medium. A focusing lens 15 is mounted on a side 11b which is remote from the surface 11a, in the present example on the slider body 11.

Figure 7:
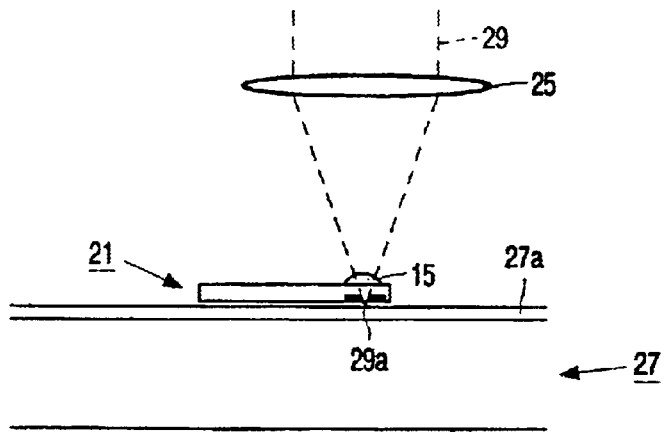

The application shown in FIG. 7 includes a slider of the type as shown in FIGS. 5 and 6. The slider, referenced 21 here, cooperates with an optical system which, in addition to the focusing lens 15, includes an objective lens 25. During scanning an MO medium 27 having a recording layer 27a is moved relative to the slider 21, the slider 21 floating at a small distance from the MO medium. A laser beam 29 is then focused to a spot 29a in the recording layer 27a.

Figure 8:
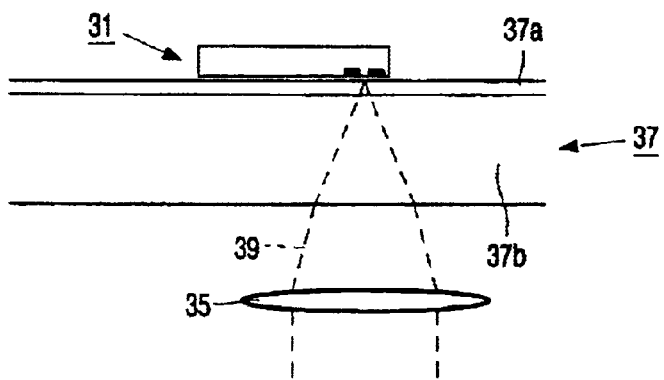

FIG. 8 shows another application using a slider 31 of a type as shown in FIGS. 5 and 6 but without a focusing lens. In this application the slider 31 also floats above an MO medium 37 but the laser beam 39 required for scanning traverses a transparent substrate 37b of the medium 37 before it reaches an MO layer 37a. For this purpose, the medium 37 is interposed between the slider 31 and an objective lens 35 of an optical system.

Figure 9:
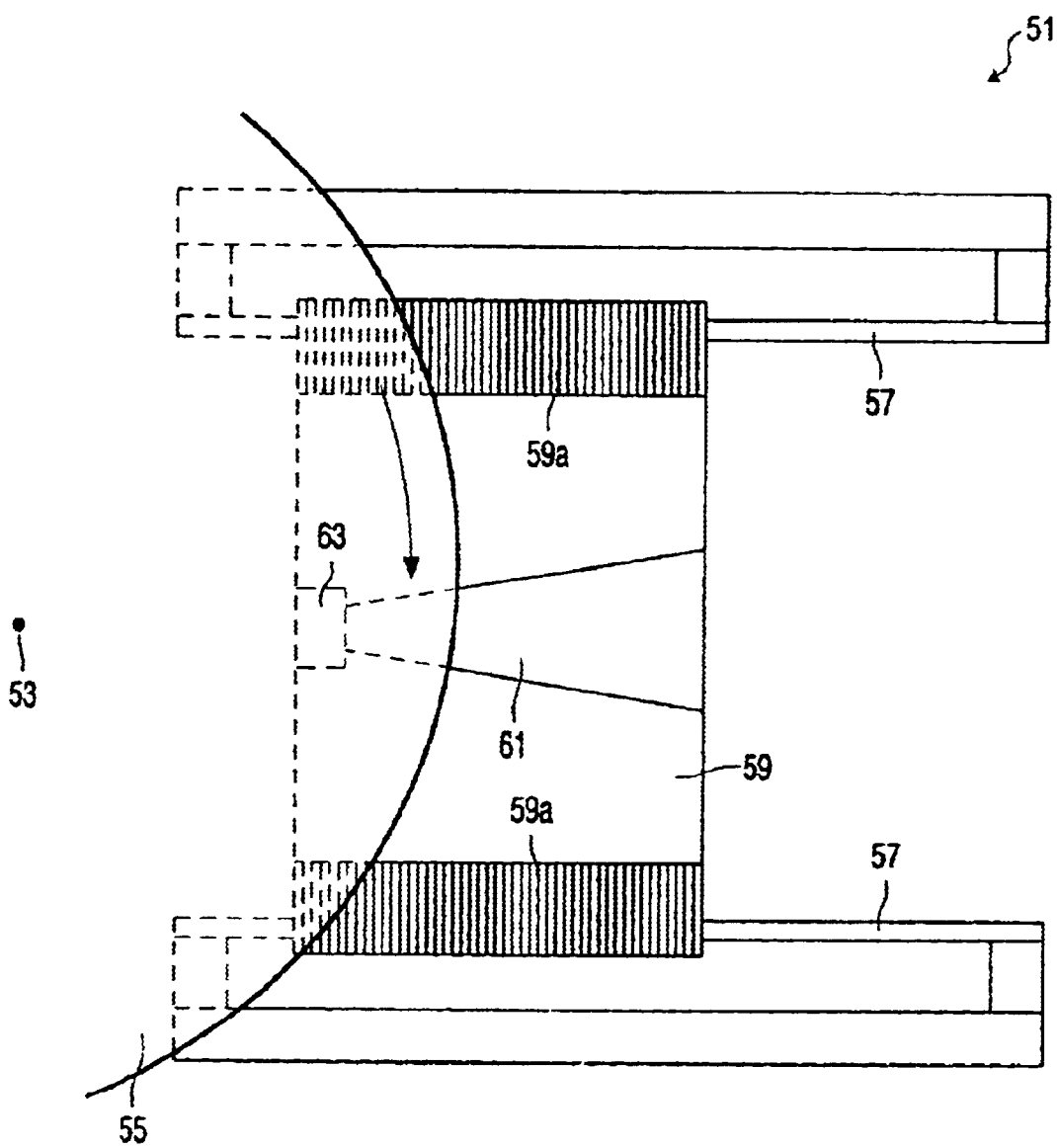

The embodiment of the device in accordance with the invention shown in FIG. 9 has a frame 51 which rotatably supports a spindle 53 for an MO disc 55 and which has two magnetic yokes of a slide drive secured to it. The slide drive further includes two drive coils 59a which cooperate with the yokes 57. The drive coils 59a form parts of a slide 59 capable of performing radial translational movements with respect to the spindle 53. The slide 59 has a spring suspension 61, which carries an embodiment 63 of the slider in accordance with the invention. In the present example the slider 63 is of a type as shown in FIG. 5.

It is to be noted that the invention is not limited to the examples shown herein. Thus, the magnetic coil may have more than two coil layers. Moreover, one of the coil layers may include only one turn. Furthermore, it is possible to use a magnetic head in accordance with the invention secured to or mounted on the slider, instead of a magnetic head integrated in the slider.

What is claimed is:

1. A magnetic head for use in a magneto-optical device, wherein said magnetic head includes an at least substantially flat magnetic coil having a central opening, wherein said coil has coil layers which extend at least substantially parallel to each other, each of the coil layers having at least one electrically conductive turn which extends around the central opening, wherein at least one of the coil layers has turns, of which the turns situated nearer the central opening have smaller widths than the turns situated farther away from the central opening, and wherein a first coil layer of said coil layers has an outermost turn situated nearer the central opening than the outermost turn of one of the other coil layers, such that an overall diameter of said first coil layer is substantially smaller than an overall diameter of said other coil layers.

2. A magnetic head as claimed in claim 1, wherein at least two of the coil layers each have turns, of which turns the turns situated nearer the central opening have smaller widths than the turns situated farther away from the central opening.

3. A magnetic held as claimed in claim 1, wherein the decrease of the widths of the turns towards the central opening varies uniformly.

4. A magnetic head as claimed in claim 1, wherein the one outermost turn is situated substantially nearer the central opening than the other outermost turn.

5. A magnetic head as claimed in claim 1, wherein the coil layers are thin-film layers.

6. A magnetic head as claimed in claim 5, wherein at least two of the coil layers are arranged on a flat base.

7. A slider for us in a magneto-optical device and including the magnetic head as claimed in claim 1.

8. A slider as claimed in claim 7, having a slider body with which the magnetic head is integrated.

9. A magneto-optical device including the magnetic head as claimed in claim 1.

10. A magneto-optical device including the slider as claimed in claim 7.

11. A method of manufacturing a magnetic head said magnetic head including an at least substantially flat magnetic coil having a central opening, said method comprising:

providing said coil with coil layers which extend at least substantially parallel to each other;

providing each of the coil layers with at least one electrically conductive turn which extends around the central opening, wherein at least one of the coil layers has turns, of which the turns situated nearer the central opening have smaller widths than the turns situated farther away from the central opening;

providing a first coil layer of said coil layers with an outermost turn situated nearer the central opening than the outermost turn of one of the other coil layers, such that an overall diameter of said first coil layer is substantially smaller than an overall diameter of said other coil layers; and planarizing after the provision of said first coil layer but before the provision of a second coil layer.

* * * * *